3,116,253
COMPOSITION OF MATTER
Lothar H. Brixner, West Chester, Pa., assignor to E. I. du Pont de Nemours and Company, Wilmington, Del., a corporation of Delaware
No Drawing. Filed Jan. 3, 1961, Ser. No. 80,006
9 Claims. (Cl. 252—62.3)

This invention relates to new thermoelectric materials.

It is an object of the present invention to produce thermoelectric materials which are useful in devices where a Seebeck voltage (thermocurrent) is required. Such materials are substantially homogeneous crystalline products containing silver, a heavy metal selected from the group consisting of columbium, tantalum, molybdenum, and tungsten, and a chalkogen selected from the group consisting of selenium and tellurium, the atom ratio of silver to heavy metal to chalkogen being 2:1:3.

The products of this invention can be prepared by firing under inert conditions a powdered mixture of the constituent elements in the above-specified ratio. The duration of the firing period will vary, depending upon the reactants used, the size of the charge, and the equipment used in firing. The firing procedure used to produce the products of this invention is conventional, and one skilled in the art can readily determine optimum firing time for any given set of conditions. Firing causes an increase in the volume of the charge, and the product obtained is a crystalline material of uniform composition which can be pressed into a compact mass of desired shape for use in thermoelectric applications. It is preferred to use as starting materials commercially available reactants of highest purity, and to have them in a −200 mesh (standard screen scale) particle size before firing.

In a preferred method of preparation, the products of this invention are formed by the following procedure: A powdered mixture of silver and one of the heavy metals heretofore specified and either selenium or tantalum in an atom ratio of 2:1:3 are blended together. This may be conveniently accomplished by a grinding operation. The blended mixture is then compacted into pellets and fired under inert conditions at temperatures in the range of about 700° C. to 1100° C. for a period of about 1 to 16 hours. The product of this first firing can then be pressed into a desired shape for use as in thermoelectric applicatons. However, it is more desirable to regrind the product of the first firing, repress it into a desired shape, and refire to sinter the material into a strong, coherent end-product of convenient shape for the application in which it is to be used.

For a clearer understanding, the following specific examples are given. These examples are intended to be merely illustrative of the invention and not in limitation thereof. Unless otherwise specified, all parts are by weight.

EXAMPLE I

A thermoelectric material comprising silver, columbium, and tellurium was prepared by the following procedure: A homogeneous mixture comprising 4.000 parts silver, 1.722 parts columbium, and 7.10 parts tellurium was prepared by thoroughly blending the component (−200 mesh) powders. This powder mix was then sealed under vacuum in a quartz ampoule measuring 15 mm. x 20 cm. The ampoule was slowly heated to 700° C. and this temperature maintained for a period of 12 hours. The ampoule was then furnace cooled. A crystalline reaction product resulted. This product was reground and pressed into a bar ¼″ x ¼″ x 2″ and the bar was refired in vacuum at 600° C.

The product obtained was thermally stable to a temperature of at least 800° C. The resistivity of the bar was measured by the four-point method and was found to be 1.13 milliohm-cm. Electrical energy was developed by butting the bar between two copper blocks (machined from the same piece of stock) maintained at different temperatures. The temperatures were measured at approximately the cross-sectional center of the bar immediately behind the contact faces. With a temperature differential ($\Delta T$) of 134° C. ($T_1=30°$ C., $T_2=164°$ C.) an E.M.F. of 12.0 millivolts was obtained. The Seebeck coefficient $$\left(\frac{\text{E.M.F.}}{\Delta T} \times 1000\right)$$

was calculated from this data. This value and other electrical properties are given in the table which follows the examples.

EXAMPLE II

Using the same procedure as described in Example I, 5.0000 parts silver, 2.2235 parts molybdenum, and 8.8715 parts tellurium, each of −200 mesh particle size, were thoroughly blended and sealed in an evacuated quartz ampoule. The ampoule was heated to 900° C. and this temperature was maintained for 12 hours. The crystalline reaction product was ground and pressed into a bar ¼″ x ¼″ x 2″. This bar was refired for 6 hours at 700° C. in vacuum and furnace cooled.

The product was tested for electrical properties as described in Example I and these are summarized in the table below which follows the examples.

EXAMPLE III

Using the same procedure as given in Example I, 5.0000 parts silver, 4.2620 parts tungsten, and 8.8715 parts tellurium were blended, sealed in a quartz ampoule, and heated. In this case, however, it was found that the reaction mixture would melt at temperatures slightly above 600° C. The temperature for the heating of the reactants was, therefore, held at 500° C. for 12 hours. The temperature was then raised to 700° C. to completely melt the contents of the ampoule. The ampoule and contents were then furnace cooled, the reaction product ground, repressed into a bar ¼″ x ¼″ x 2″, and refired at 500° C. in vacuum for 1 hour. The product was tested as described in Example I, and the results are summarized in the table below which follows the examples.

EXAMPLE IV

Using the same procedure as in Example I, a powder mix was prepared comprising 3.0000 parts silver, 2.514 tantalum, and 5.3229 parts tellurium. The thoroughly blended powders were heated in an evacuated quartz ampoule at 700° C. for 12 hours. At the conclusion of this heating period, the reaction product was furnace-cooled, ground, pressed into a bar ¼″ x ¼″ x 2″, refired in vacuum at 600° C. for 2 hours, and furnace-cooled. The product was tested in the manner described in Example I, and the results are given in the table which follows the examples.

EXAMPLE V

Using the same procedure as in Example I, a homogeneous, powdered mixture comprising 5.000 parts silver, 2.153 parts columbium, and 5.490 parts selenium was prepared. This mixture was heated in an evacuated quartz ampoule at 700° C. for 12 hours. At the conclusion of this heating period, the reaction product was furnace-cooled, ground, pressed into a bar ¼″ x ¼″ x 2″, and refired in vacuum for a period of 14 hours at 800° C. The product obtained was tested in the manner described in Example I, and the results are given in the table that follows the examples.

EXAMPLE VI

Using the same procedure as in Example I, a homogeneous, powdered mixture comprising 5.000 parts silver, 2.2235 parts molybdenum, and 5.450 parts selenium was prepared. This mixture was heated in an evacuated quartz ampoule at 900° C. for 12 hours. At the conclusion of this heating period, the reaction product was furnace-cooled, ground, pressed into a bar ¼" x ¼" x 2", and refired in vacuum for a period of 12 hours at 800° C. The product obtained was tested in the manner described in Example I, and the results are given in the table that follows the examples.

EXAMPLE VII

Using the same procedure as in Example I, a homogeneous, powdered mixture comprising 4.0000 parts silver, 2.5452 parts tantalum, and 4.3920 parts selenium was prepared. This mixture was heated in an evacuated quartz ampoule at 900° C. for 12 hours. At the conclusion of this heating period, the reaction product was furnace-cooled, ground, pressed into a bar ¼" x ¼" x 2", and refired in vacuum for a period of 12 hours at 1100° C. The product obtained was tested in the manner described in Example I, and the results are given in the table that follows the examples.

EXAMPLE VIII

Using the same procedure as in Example I, a homogeneous, powdered mixture comprising 4.0000 parts silver, 3.4096 parts tungsten, and 4.3920 parts selenium was prepared. This mixture was heated in an evacuated quartz ampoule at 900° C. for 12 hours. At the conclusion of this heating period, the reaction product was furnace-cooled, ground, pressed into a bar ¼" x ¼" x 2", and refired in vacuum for a period of 12 hours at 1100° C. The product obtained was tested in the manner described in Example I, and the results are given in the table that follows the examples.

The following table gives electrical data on the materials of Examples I–VIII. It has not been clearly established whether these new products are true compounds, altho X-ray diffraction data indicates the presence of new lines. The last column entitled "Figure of Merit in °C.$^{-1}$" is a calculated figure which those skilled in the art use to evaluate thermoelectric materials. This figure takes into account the fact that low resistivity and low thermal conductivity as well as a high Seebeck coefficient are necessary for a good thermoelectric material. The equation for calculating the "figure of merit" is as follows:

$$Z(\text{figure of merit in } °C.^{-1}) = \frac{S^2}{rk}$$

where $r$ is the resistivity in ohm-cm., $k$ is the thermal conductivity in watts per cm.-degree, and $S$ is the Seebeck coefficient in volts per degree.

mechanical parts. The measured properties also make it evident that these new compositions could be used for thermoelectric cooling by the Peltier effect. In either case, the useful device will consists of pairs of semi-conducting elements, one of which contains an excess of conducting electrons, and the other a slight deficiency. For example, the composition containing silver, niobium and tellurium in the atom ratio of 2:1:3 (p-type) was used in the construction of a thermoelectric generator demonstration model in conjunction with an equiatomic n-type CdSb alloy. The thermocouple elements prepared for this particular demonstration had the following properties at the mean design temperature of 400° C.:

|  | Ag, Nb, Te Composition | CdSb |
|---|---|---|
| Electrical resistivity, ohm-cm | 1.13×10$^{-3}$ | 2.5×10$^{-3}$ |
| Termal conductivity, watt/cm.-deg | 1.9×10$^{-2}$ | 4×10$^{-2}$ |
| Length of elements, inches | 13/16 | 13/16 |
| Diameter of elements, inches | 0.056 | 0.053 |
| Seebeck coefficient of couple, microvolt/°C | 370 | |

The elements were fabricated by hydrostatic pressing of prefired material, followed by sintering, grinding.

The generator model was designed according to the well known optimizing conditions described by Altenkirch in 1909 (see A. F. Ioffe, Semiconductor Thermoelements and Thermoelectric Cooling, London, 1957, chapter 2). The body of the generator consists of a cylindrical shell molded from fibrous potassium titanate (a felt-like insulating material, U.S. Pat. 2,833,620), with an outside diameter of 3", a wall thickness of ⅝", and an over-all length of 7". Internal end-plugs, ¾" thick, are provided from the same insulating material, leaving a cylindrical cavity 5½" long and 1¾" in diameter. Forty-four elements of each kind are inserted in holes drilled in the cylindrical wall in such a manner as to provide a tight fit. They are arranged in 11 layers of 8 elements (4 of each kind), separated by 45° within the layers, while successive layers are offset by 22.5° and spaced ½" apart. Both ends of the elements are nickel-plated. The inside ("hot face") ends are connected by hard-soldered braided copper conductor straps, the outer ("coldface") ends with similar, soft-soldered straps. The connections are made in such a fashion that the 44 couples are in series, with the two output connections on the "cold face." These are provided with soft-soldered standard terminal plugs, and are connected to a voltmeter and to a 6 v.–6w. incandescent light bulb through an ammeter. An auxiliary copper-constantan thermocouple is soldered to one of the center cold-face terminals; it can be read with a standard potentiometer. A 1" dia. x 3⅜" long, 115 v.–300 w. cartridge heater wrapped with two layers of "Refrasil" cloth serves as the heat source of the generator mode; its leads are brought out through holes in one of the fibrous potassium titanate end plugs. The entire assembly is enclosed in a cylindrical steel case provided with a 6-terminal electrical feed-

*Table*

| Example No. | Elements Present in Composition in Atom Ratio 2:1:3 | Temp. at Cold Face (T$_1$),° C. | Temp. at Hot Face (T$_2$),° C. | Seebeck Coefficient in Microvolts per °C. (S) | Resistivity in Milli-ohm-cm. (r) | Thermal Conductivity, watts/ deg. cm. | Figure of Merit in °C$^{-1}$ |
|---|---|---|---|---|---|---|---|
| I | Ag, Nb, Te | 30 | 164 | 178 | 7 | 0.019 | 1.48×10$^{-3}$ |
| II | Ag, Mo, Te | 27 | 152 | 530 | 76.0 | 0.015 | 0.25×10$^{-3}$ |
| III | Ag, W, Te | 29 | 148 | 1,110 | 68 | 0.014 | 1.64×10$^{-3}$ |
| IV | Ag, Ta, Te | 30 | 149 | 110 | 0.95 | 0.017 | 0.75×10$^{-3}$ |
| V | Ag, Nb, Se | 56 | 86 | 133 | 0.80 | 0.018 | 1.22×10$^{-3}$ |
| VI | Ag, Mo, Se | 30 | 50 | 360 | 10.70 | 0.02 | 0.6×10$^{-3}$ |
| VII | Ag, Ta, Se | 31 | 167 | 107 | 6.90 | 0.014 | 0.12×10$^{-3}$ |
| VIII | Ag, W, Se | 30 | 64 | 300 | 37.0 | 0.012 | 0.20×10$^{-3}$ |

From the thermoelectric properties given for the materials of this invention, it will be evident that these materials will find application in generating electric current directly from thermal energy without intervention of through connector (for the heating current, generator output and auxiliary thermocouple), with steel flanges provided with vacuum ports on the two ends. These vacuum ports are connected to each other through a circulating blower, and, by side arms on the connecting line, to a vacuum pump, helium supply cylinder and a manometer. The case surrounding the generator is wrapped with copper tubing to permit cooling with tap water. Prior to operation, the assembly was evacuated, then filled with helium. After starting circulation of the helium and the flow of cooling water, power was applied to the heater cartridge through a variable transfer provided with an ameter and a voltmeter. It was adjusted until the open-circuit voltage of the generator (determined by momentarily unscrewing the light bulb from its socket) was 11.5 v., indicating a temperature differential of about 700° C. At the same time, "cold-face" temperature shown by the auxiliary thermocouple was 64° C. The ammeter and voltmeter readings with the light bulb in the circuit indicated an output of 5.4 watts at a voltage of 5.9 v., while the power input into the heater cartridge was 186 w. Hence, the measured efficiency of the generator is 2.9% under the operating conditions described above. These operating conditions were chosen as being close to optimum; the calculated efficiency (see e.g., Ioffe, loc. cit.) was 3.1%.

Since it is obvious that many changes and modifications can be made in the above-described details without departing from the nature and spirit of the invention, it is to be understood that the invention is not to be limited to said details except as set forth in the appended claims.

This application is a continuation-in-part of my copending application Ser. No. 45,555, filed July 27, 1960, now abandoned.

The embodiments of the invention in which an exclusive property or privilege is claimed are defined as follows:

1. A process for the production of a thermoelectric composition of matter comprising firing in a closed system, at a temperature of from 700° C. to 1100° C. for a period of from 1 to 16 hours, a powdered mixture of silver, a heavy metal from the group consisting of columbium, tantalum, molybdenum, and tungsten, and a chalkogen selected from the group consisting of selenium and tellurium, the atom ratio of silver to heavy metal to chalkogen being 2:1:3.

2. A process for the production of a thermoelectric composition of matter comprising firing in a closed system, at a temperature of from 700° C. to 1100° C. for a period of from 1 to 16 hours, a powdered mixture of silver, a heavy metal from the group consisting of columbium, tantalum, molybdenum, and tungsten, and a chalkogen selected from the group consisting of selenium and tellurium, the atom ratio of silver to heavy metal to chalkogen being 2:1:3, and then recompacting and refiring the product of the first firing.

3. A substantially homogeneous crystalline composition of matter having thermoelectric properties comprising silver, a heavy metal from the group consisting of columbium, tantalum, molybdenum, and tungsten, and a chalkogen selected from the group consisting of selenium and tellurium, the atom ratio of silver to heavy metal to chalkogen being 2:1:3.

4. A substantially homogeneous crystalline composition of matter having thermoelectric properties comprising silver, columbium, and tellurium, in an atom ratio of 2:1:3.

5. A substantially homogeneous crystalline composition of matter having thermoelectric properties comprising silver, tantalum, and tellurium, in an atom ratio of 2:1:3.

6. A substantially homogeneous crystalline composition of matter having thermoelectric properties comprising silver, molybdenum, and tellurium, in an atom ratio of 2:1:3.

7. A substantially homogeneous crystalline composition of matter having thermoelectric properties comprising silver, tungsten and tellurium, in an atom ratio of 2:1:3.

8. A substantially homogeneous crystalline composition of matter having thermoelectric properties comprising silver columbium, and selenium, in an atom ratio of 2:1:3.

9. A substantially homogeneous crystalline composition of matter having thermoelectric properties comprising silver, molybdenum, and selenium, in an atom ratio of 2:1:3.

References Cited in the file of this patent

UNITED STATES PATENTS

| | | |
|---|---|---|
| 2,882,467 | Wernick | Apr. 14, 1959 |
| 2,882,468 | Wernick | Apr. 14, 1959 |
| 2,882,471 | Wernick | Apr. 14, 1959 |